United States Patent

[11] 3,584,784

[72] Inventor Robert Burhop
   Le Manoir, Bernex, Geneva, Switzerland
[21] Appl. No. 817,114
[22] Filed Apr. 17, 1969
[45] Patented June 15, 1971
[32] Priority May 8, 1968
[33] Switzerland
[31] 6873/68

[54] MIXING VALVE FOR HOT AND COLD WATER
   8 Claims, 3 Drawing Figs.
[52] U.S. Cl. .................................................. 236/12,
   137/625.34
[51] Int. Cl. ............................................... G05d 23/13
[50] Field of Search ............................................ 137/625.34,
   625.4; 236/12

[56] References Cited
   UNITED STATES PATENTS
2,001,534 5/1935 Hughes......................... 137/625.34 X
3,012,583 12/1961 Gorgens et al................. 137/625.34

3,028,094 4/1962 Burhop....... ...... . ..... 236/12

Primary Examiner—William E. Wayner
Attorneys—Emory L Groff and Emory L Groff, Jr.

ABSTRACT: A mixing valve for hot and cold water, has a body with a hot and a cold water inlet and an outlet nozzle. The body bears a flow control knob and a temperature control knob which may be incorporated in one knob. These controls are borne on a stem bearing two valves forming part of two gates for simultaneous control of the flows of hot and cold water. A bush sliding coaxially on the stem downstream of the two gates and upstream of the mixing chamber forms a differential closure actuated by a thermostatic element housed in the mixing chamber. The relative position of one valve to the other on the stem is axially adjustable by means of a threaded tubular cap bearing it on the stem and fixable by a locking screw. A spring-restored pushrod forming a stop for the thermostatic element is actuated by rotation of a hub connected to the temperature control knob. Flow control can alternatively be effected by a rocking lever stabilized by frictional grip of a compressible packing box seal.

MIXING VALVE FOR HOT AND COLD WATER

The present invention relates to a mixing valve for hot and cold water.

It is an object of the present invention to provide a mixing valve for hot and cold water which can be readily adjusted.

According to the invention there is provided a mixing valve for hot and cold water, comprising a body provided with two inlets for hot and cold water pipes and an outlet nozzle for mixed water, at least one control member for regulating delivery and for regulating the temperature of the mixed water, this control member acting on a stem bearing two valves forming part of two gates for simultaneous control of the flows of hot water and cold water respectively, a differential closure member being arranged downstream of the two gates and upstream of a mixing chamber in which there is a thermostatic element with adjustable position for the temperature adjustment and acting on the said differential closure member, the position of at least one of the valves with respect to the other on the stem which bears them being axially adjustable.

In order that the invention may be more fully understood, two embodiments of a mixing valve according to the invention are described below purely by way of illustrative but nonlimiting example, with reference to the accompanying diagrammatic drawing in which.

Figure 1:
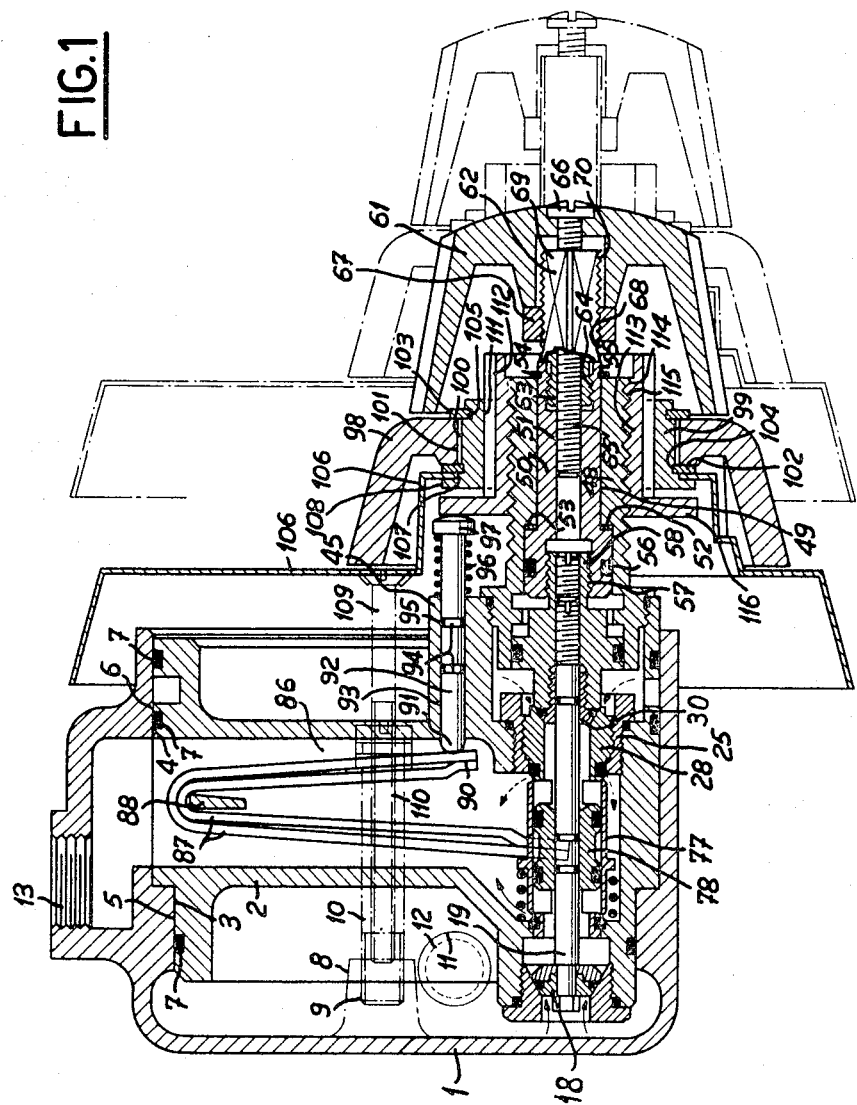
FIG. 1 is a view in axial section of the first embodiment of a mixing valve according to the invention.

Referring now to the drawing, these embodiments comprise a body formed of two principal parts, namely a casing 1 and a central body 2. The casing 1 has inner cylindrical collars 3 and 4 and the central body 2 corresponding cylindrical parts 5 and 6, so that it can be engaged in the casing 1 by sliding with the interposition of sealing rings 7 in the form of a toric joint. In the casing 1 are formed bosses 8 provided with a tapped bore 9. A tubular screw 10 is engaged in each tapped bore 9 to ensure the maintenance of the central body 2 in the casing 1.

On this casing 1 are formed two inlets 11 and 12, the inlet 11 being provided for the connection to a cold water conduit, whilst the inlet 12 is provided for connection to a hot water pipe. In addition, a nozzle 13 is also formed on the casing 1 to enable the outflow of mixed water in the direction of a supply pipe.

A threaded bore 14 is formed on the inside of the central body 2. In the left part of this bore 14 is screwed a ring 15 bearing the seat 16 of the control gate for the discharge of cold water. This ring 15 is screwed with interposition of a toric sealing ring 17. The valve 18 of this control gate for cold water is borne by the end of a stem 19 on which it is fixed by a nut 20. This valve 18 is itself formed of two parts 21 and 22 defining between them a groove 23 serving as housing for a toric seal 24.

In the right part of the bore 14 is engaged a rod 25 with the interposition of a sealing ring 26. This rod 25 is itself tapped internally at 27 to receive a threaded ring 28 bearing the seat 29 of the control gate for the discharge of hot water. The valve 30 of this hot water delivery gate is also fixed on the stem 19. This valve 30 comprises two main parts, namely a cap 31 having a tapped bore 32, in which is screwed the second part 33 of the valve. A groove 34 exists between these two parts 31 and 33, which groove serves as housing for a toric seal 35. A groove 36 arranged in the stem 19 serves as housing for a toric seal 37 ensuring tightness between the stem 19 and the valve 30. The cap 31 has a tapped bore 38 of smaller section than the bore 32, in which is screwed the stem 19 by its part 39 in the form of a screw. A screwdriver notch 40 is arranged at the end of the stem 19. A counterscrew 41 is also engaged in the tapped bore 38 to lock the stem 19 in position with respect to the cap 31.

This screw mounting of the cap 31 and of the part 33 of the valve 30 on the stem 19 hence enables an axial adjustment of the valve 18 with respect to the valve 30.

The cap 31 is surrounded by a tubular part 42 having a threaded part 43 enabling its mounting in a tapped bore 44 presented by a boss 45 of the central body 2. A sealing ring 46 is interposed between this boss 45 and the tubular part 42 and another sealing ring 47 is interposed between this tubular part 42 and the cap 31. This tubular part 42 has an extension 48 in the bore 49 of which is engaged a sleeve 50 having a tapped bore 51. This sleeve 50 is held axially fixed with respect to the tubular part 42 due, on one hand, to a bearing 52 cooperating with a shoulder 53 of the part 42 and, on the other hand, to an elastic ring 54 engaged in a groove 55 of the sleeve 50. A sealing ring 56 is arranged between the parts 42 and 50. The left part of the sleeve 50, which is of the larger cross section, has a tapped bore 57 in which is engaged a threaded extension 58 of the cap 31. Any angular displacement of the sleeve 50 causes therefore an axial displacement of the cap 31 and thus of the stem 19 and of the two valves 18 and 30. The fixed angular position of the cap 31 is ensured due to the cooperation of a square opening 59 arranged in the part 42 and a collar 60 of corresponding form presented by the cap 31.

The flow-regulating member is constituted by a handle, or know, 61, fixed to the sleeve 50 by an intermediate part 62 of which one end 63, which is fluted, is engaged in corresponding grooves 64 arranged in the right end or outer end of the sleeve 50. A screw 65 engaged in the tapped bore 51 of the sleeve 50 ensures the holding in position of the button 61 clamped between the head 66 of this screw 65 and a nut 67 mounted in adjustable manner on a threaded part 68 of the intermediate part 62. This part 62 has an end 69 of squared section cooperating with a housing 70 of corresponding shape arranged in the button 51. This particular mounting of the button 61 through the part 62 and the screw 65 enables an adjustment in depth of the button 61 with respect to the body of the mixing valve, so as to adapt this adjustment according to the depth of embedding of the body of the mixing valve in the wall in which it is mounted.

The ring 28 constitutes one and the same part with a tubular guide member 71 arranged in the central part of the bore 14 of the central body 2. The left end 27 of this guide member 71 has a groove 73 serving as housing for a toric seal 74. A toric seal 75, of similar shape, is arranged in a groove 76 arranged in the right part of the member 71, that is to say in the part forming the ring 28. These two toric seals 74 and 75 constitute the seats of a differential closure formed by a bush 77 borne by the central part 78 of the member 71. This central part 78 has two grooves 79 serving as housing for toric seals 80. For its part, the stem 19 has two grooves 81 serving as housing for toric seals 82 ensuring the sealing between this stem 19 and the central part 78 of the guide member 71. A spring 83 is interposed between a support bearing 84 of the central body 2 and a shoulder 85 of the bush 77. This differential closure 77 is hence arranged downstream of two control gates for delivery of cold water 16, 18 and delivery of hot water 29, 30. Downstream of this differential closure 77 is located the mixing chamber 86 ending at the nozzle 13 for the distribution of mixed water. In this mixing chamber 86 is arranged a thermostatic element 87, in this instance a bimetallic element intended for the regulation of the temperature of the mixed water. This bimetallic element 87 is in the general shape of a U arranged on a crosspiece 88 of the central body 2. The end 89 of this bimetallic element 87 is in the form of a fork and is engaged against the right side of the shoulder 85 of the bush 77 constituting the differential closure. The other end 90 of the bimetallic element 87 is supported against the end 91 of a pushrod 92 capable of sliding axially in a bore 93 arranged in the boss 45 of the central body 2. This pushrod 92 has two grooves 94 serving as housing for sealing rings 95. A spring 96 supported, on one hand, against the boss 45, and, on the other hand, against a head 97 of the pushrod, tends to withdraw the latter out of the boss 45.

Temperature regulation is effected by pushing back more or less inside the boss 45 the pushrod 92 acting on the bimetallic element 87. This action on the stem 92 is effected from the temperature regulating member 98 which is mounted so as to be able to turn with axially fixed hub 99. In fact, this hub 99 comprises channellings 100 on which is engaged the central opening 101 of corresponding form of the member 98 which is in the form of a disc or driving wheel. The member 98 is held fixed axially on the hub 99 by two elastic rings 102 and 103 engaged in grooves 104 and 105 respectively of the hub 99. The axial position of this hub 99 with respect to the body of the mixing valve is ensured due to a cover 106 having an opening 107 in which is engaged the hub 99. The latter has a flange 108 supported against one side of the cover 106, whilst on the other side it is supported against this cover by the elastic ring 102. The cover 106 is itself held against the body 1, 2 of the mixing valve by crews 109 screwed in a tapped bore 110 arranged in each screw 10 for fixing the central body 2 in the casing 1. This assembly of the cover 106 by screws 109 enables an adjustment in depth adapting the position of the cover 106 to the depth to which the body of the mixing valve is embedded in a wall.

The hub 99 has internally grooves 111 engaged on corresponding grooves 112 arranged in the periphery of a bushing 113. This bushing 113 has a tapped bore 114 by which it is engaged on a threaded part 115 of the extension 48 of the tubular part 42 held against the central body 2. This bushing 113 has a flange 116 acting on the head 97 of the pushrod 92.

It is understood without adding to the preceding description that any angular displacement given to the temperature control member 98 causes an axial displacement of the bushing 113, this being due to the cooperation of the tapped bore 114 of the said bushing 113, with the threaded part 115. There results therefore from this axial displacement of the bushing 113 a displacement in the same direction and of the same amplitude of the pushrod 92 acting on the end 90 of the bimetallic element 87.

Of course, a thermometric scale will be marked between the control member 98 and the cover 106 to enable, after calibration, the desired choice of a certain temperature of mixed water. The essential advantage of the mixing valve described above with regard to FIG. 1 is that its special assembly enables regulation of the respective position of the tow valves 18 and 30 of the two flow regulation gates, even though the hot water and cold water installations are under pressure. In fact, the dismounting of the control member 61 by removal of the screw 65 enables access, by means of a screwdriver, in the counterscrew 41, and to remove the latter by means of a magnetic screwdriver, for example. After removing this counterscrew 41, it is possible to reach by means of a screwdriver the slot 40 of the stem 19 and thus to drive this angularly to effect the desired adjustment of the position of the two valves 18 and 30. Such an adjustment is done on the first mounting of the mixing valve and possibly also after wear is produced in the latter after a certain period of use.

In operation, cold water enters through inlet 11 and is provided at the left-hand side of valve 18 as indicated by the arrows in FIG. 1. Hot water enters through inlet 12 provided at the opposite side of the casing and passes through suitable passage means in central body 2 to the right-hand side of valve 30 as indicated by the dotted arrows in FIG. 1.

Temperature regulating member 98 is adjusted so as to adjust the force supplied to bimetallic element 87 for controlling the temperature of the water which is discharged from outlet 13.

Figure 3:
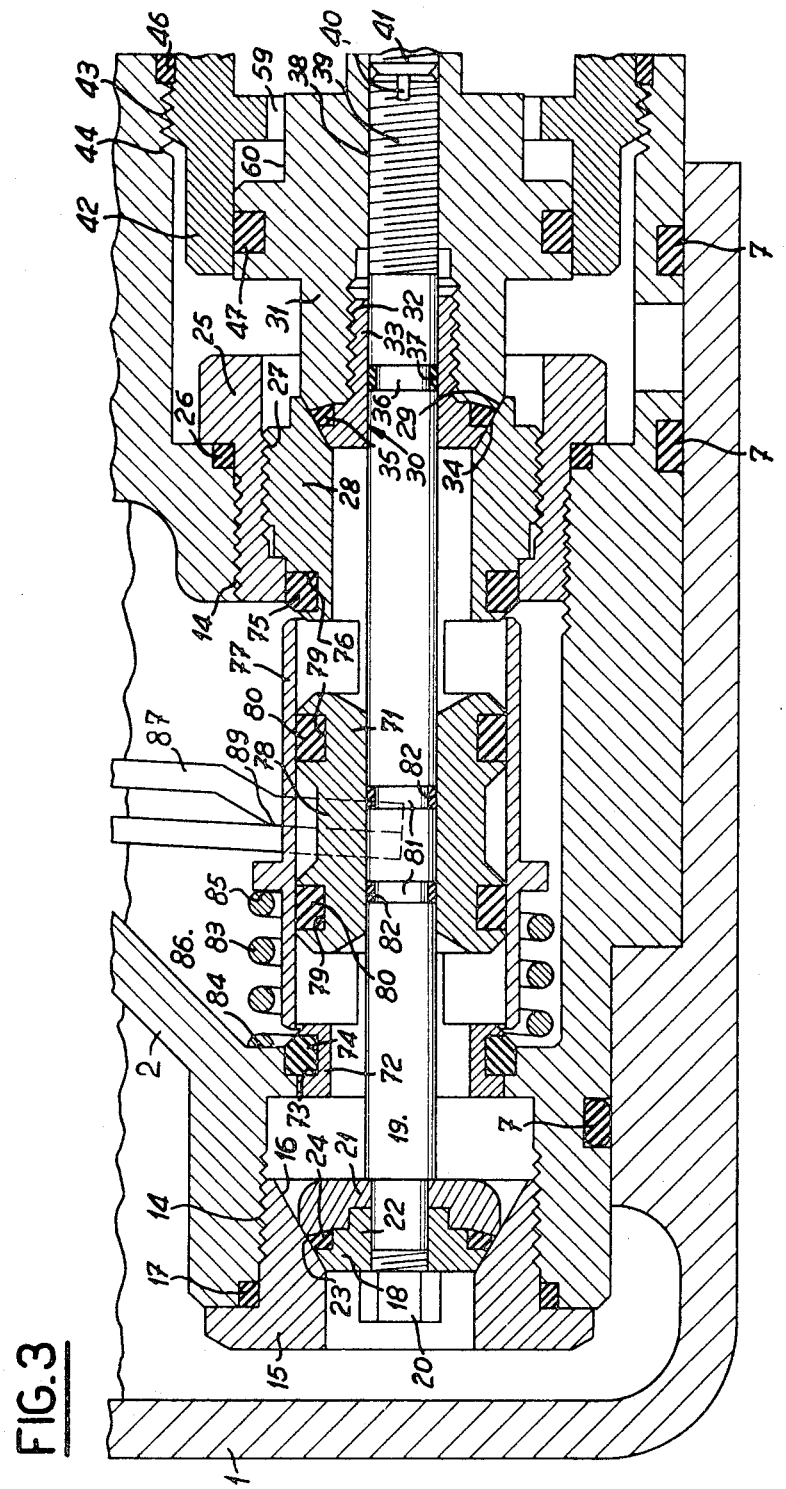
FIG. 3 is an enlargement of a part of the embodiment of FIG. 1.

Know 61 is then rotated so as to produce axial displacement of stem 19 so as to cause valves 18 and 30 to be simultaneously opened allowing water to pass into the space defined within bush 77. Bimetallic element 87 and spring 83 control the axial position of bush 77 so as to adjust the relative amounts of hot and cold water which can pass from the interior of the bush about the ends thereof into mixing chamber 86 whereby the temperature of the mixed water is accurately regulated. When it is desired to shut off the water, know 61 is operated in the opposite direction so as to cause valves 18 and 30 to again seat in the position as shown in FIGS. 1 and 3 to interrupt the flow of water through the mixing valve.

Figure 2:
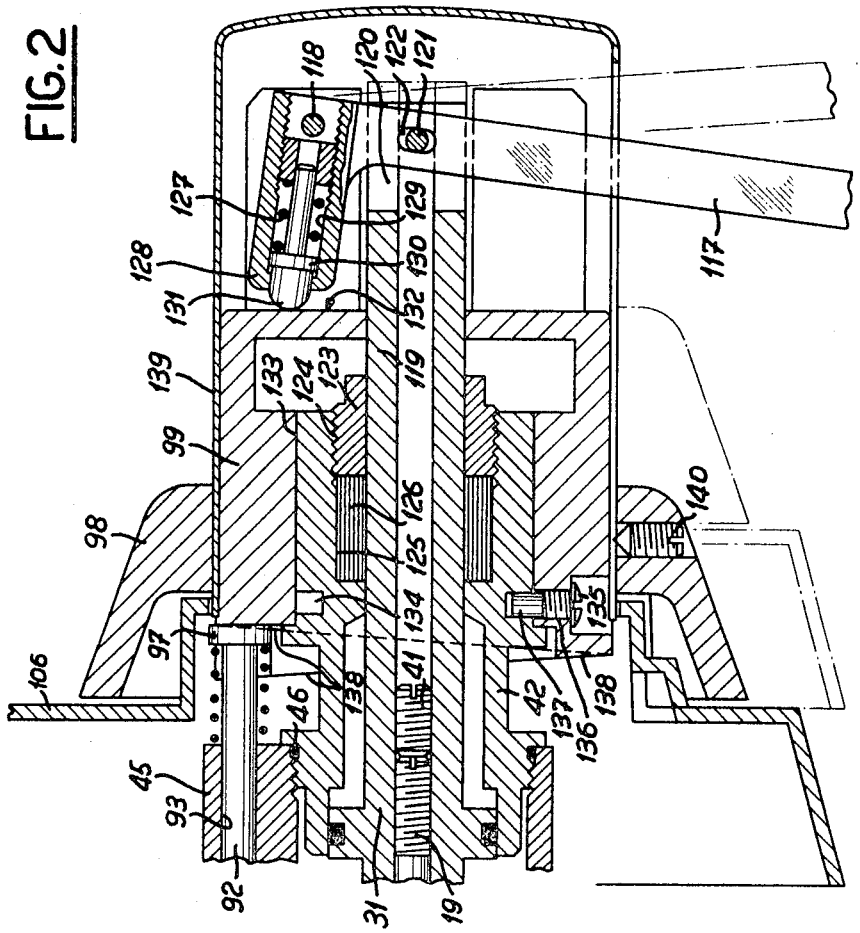
FIG. 2 is a partial view similar to the preceding one of the second embodiment.

The second embodiment of the mixing valve shown in FIG. 2 comprises the same essential elements as those of the first embodiment, hence, in particular, the inlets for hot and cold water, the outlet pipe and especially the same device enabling the adjustment in position of the two valves 18 and 30 on the common support stem 19. However, in this second embodiment the flow adjustment, instead of being done by means of a rotary knob 61, is effected by means of a lever 117 hinged on a shaft 118 fixed with respect to the body of the mixing valve. The cap 31 has a tubular extension 119 transversely slotted at 120 at its outer end. The lever 117 is engaged in this slot 120. A shaft 121 engaged transversely in the extension 119 passes through an elongated opening 122 of the lever 117. Thus, any rocking movement transmitted to this lever 117 causes an axial displacement of the cap 31 and thus of the stem 19 rigidly attached to the two valves 18 and 30. When the relative axial position of the two valves 18 and 30 has to be adjusted, it suffices to dismount the lever 117 by driving out the two shafts 118 and 121 to be able then to introduce a screwdriver into the central bore of the cap 31 to reach the counterscrew 41, as well as the stem 19.

A stable axial position is ensured for the cap 31 determining a particular flow of hot and cold water, this due to a friction device of the packing-box type, constituted by a ring 123 screwed in a bore 124 of the tubular part 42. A housing 125 is provided in this part 42 for a friction ring 126 capable of being compressed in this housing 125 by the ring 123. In addition, the lever 117 is subject to the action of a spring 127 tending to bring back this lever 117 into position of closing the delivery regulating gates. In fact, the arm 128 of the lever 117 has internally a cylindrical bore 129 in which is capable of sliding a plunger piston 130 against which the spring 127 acts. The end 131 of this plunger system 130 is supported against a face 132 fixed axially, which tends to make the lever 117 pivot in clockwise direction.

In this second embodiment, the temperature regulating member 98 is borne by a hub 99 mounted itself to rotate on a bearing 133 arranged on tubular part 42. A screw 135 is engaged in a tapped bore 136 of the hub 99. The tip 137 of this screw enters the groove 134, which ensures a fixed axial position of the hub 99 on the collar 133. This hub 99 bears an axial cam 138 acting on the head 97 of the pushrod 92, influencing the bimetallic element 87. A dome 139 engaged around the hub 99 covers the end of the extension 119 of the cap 31, as well as the hinge of the lever 117.

In this second embodiment, the member 98 in the form of a disc is held against the hub 99, and against the dome 139 respectively by means of a radial screw 140. The adjustment of the temperature of the mixed water can, or course, be effected by rotating this control element 98. However, as the lever 117 is rigidly fixed angularly to the hub 99, it is possible to cause the rotation of the disc 98 by angular displacement of the lever 117 around the extension shaft 119 of the cap 31. The adjustment of flow, as well as the adjustment of temperature of such a mixing valve can hence be done from one common control member 117 embodying the two control members 61 and 98 of the first embodiment.

It will be apparent that various changes and modifications may be made in the embodiments described without departing from the essential concept of the invention as defined in scope by the appended claims.

I claim:

1. A mixing valve for hot and cold water, comprising a body provided with two inlets for hot and cold water pipes and an outlet nozzle for mixed water, said body supporting at least one control member for regulation of the flow and for regulation of the temperature of the mixed water, said control member acting on a stem bearing two valves forming part of two gates for simultaneous control of the flows of hot water and cold water respectively, a differential closure member being arranged downstream of the two gates and upstream of a mixing chamber in which there is a thermostatic element with position adjustable by the regulation of temperature and acting on said differential closure member, the position on said stem of at least one of said two valves with respect to the other being axially adjustable, said two valves being borne by a tubular cap having a tapped bore screwed on a screw threaded part of said stem, a locking counterscrew being threaded in said tapped bore, said tubular cap having a threaded extension cooperating with a tapped sleeve which is axially fixed in said body, rotation of said sleeve causing axial movements of said valves.

2. A mixing valve according to claim 1, comprising two separate control members, one said control member for the adjustment of flow and the other said control member for the adjustment of the temperature of the mixed water, wherein the flow control member is rigidly fixed to the said sleeve by a central screw whose dismounting of the later disengages the inside of the sleeve enabling access to the counterscrew and the screw-form part of the stem supporting the valves to enable their reciprocal adjustment, under pressure of water.

3. A mixing valve according to claim 1, comprising a tubular guide held in the body and guiding said stem, the differential closure member being formed by a bush mounted slideably on said guide concentrically with the stem.

4. A mixing valve according to claim 1, comprising two separate control members, one said control member being for flow regulation and the other for temperature regulation of mixed water, said member for temperature control being mounted so as to be rotatable with an axially fixed hub, arranged so to act on a spring-restored pushrod, one end of said pushrod serving as a stop for said thermostatic element.

5. A mixing valve according to claim 4, wherein the hub is rigidly fixed axially to a bushing with a tapped bore engaged on a threaded part restored on the body so that any angular displacement of the hub causes a corresponding angular displacement of the bushing and simultaneously an axial displacement of the latter is transmitted to the pushrod.

6. A mixing valve according to claim 1, comprising a single control member for flow regulation and for temperature regulation of mixed water, said single control member being mounted so as to be rotatable with a hub fixed axially, arranged to act on a pushrod restored by a spring and of which one end serves as a stop for the thermostatic element.

7. A mixing valve according to claim 1, including an extension on the tubular cap to which said control lever is hinged arranged to cause axial displacements of the cap and thus of said valves and a friction device ensuring a stable maintenance of the cap in the position of said axial displacement.

8. A mixing valve according to claim 6, including an extension on the tubular cap to which said control lever is hinged arranged to cause axial displacements of the cap and thus of said valves and a friction device ensuring a stable maintenance of the cap in the position of said axial displacement.